May 3, 1960 W. H. EBURN, JR 2,935,004
PHOTOGRAPHIC APPARATUS WITH SHEET-ARRESTING MECHANISM
Filed March 6, 1959 5 Sheets-Sheet 1

FIG. 1

INVENTOR.
William H. Eburn, Jr.
BY
ATTORNEYS

May 3, 1960 W. H. EBURN, JR 2,935,004
PHOTOGRAPHIC APPARATUS WITH SHEET-ARRESTING MECHANISM
Filed March 6, 1959 5 Sheets-Sheet 2

INVENTOR.
William H. Eburn, Jr.
BY Brown and Mikulka
and
Robert E. Corb
ATTORNEYS May 3, 1960  W. H. EBURN, JR  2,935,004
PHOTOGRAPHIC APPARATUS WITH SHEET-ARRESTING MECHANISM
Filed March 6, 1959  5 Sheets-Sheet 3

FIG. 4

INVENTOR.
William H. Eburn, Jr.
BY
ATTORNEYS

May 3, 1960 W. H. EBURN, JR 2,935,004
PHOTOGRAPHIC APPARATUS WITH SHEET-ARRESTING MECHANISM
Filed March 6, 1959 5 Sheets-Sheet 5

FIG. 6

INVENTOR.
William H. Eburn, Jr.
BY Brown and Mikulka
and
Robert E. Corb
ATTORNEYS

United States Patent Office 2,935,004
Patented May 3, 1960

2,935,004

PHOTOGRAPHIC APPARATUS WITH SHEET-ARRESTING MECHANISM

William H. Eburn, Jr., East Weymouth, Mass., assignor to Polaroid Corporation, Cambridge, Mass., a corporation of Delaware Application March 6, 1959, Serial No. 797,802

22 Claims. (Cl. 95—13)

This invention relates to novel means for arresting the advancement of sheet materials and is particularly concerned with novel devices for arresting the movement of sheet materials advanced manually through photographic apparatus.

It has been known to provide, in photographic apparatus through which sheet materials are advanced, devices for arresting the movement of the sheet material at predetermined intervals. A sheet arresting mechanism of this type is disclosed, for example, in Patent No. 2,543,159, issued February 27, 1951, to Murry N. Fairbank and generally includes at least one stop member adapted to engage successive regularly spaced portions of the sheet material as the latter is advanced and a portion thereof becomes aligned with the stop member. The stop member is mounted so as to be movable at least between an operative position where it can engage a portion of the sheet material during movement thereof for arresting said movement and a second position wherein the stop member is inoperative to engage and arrest the movement of the sheet material. To permit continued movement of the sheet material after it has been arrested, the stop member is moved from the operative to the second or inoperative position out of engagement with the sheet material. In the form of mechanism described in the above-mentioned patent, the stop member is so mounted that it need be withdrawn from engagement with the sheet material only momentarily, after which it may immediately return to a position in engagement with the sheet material wherein it is adapted to engage the next successive engageable portion of the sheet material as the latter is advanced into alignment with the stop member.

The device or mechanism of the present invention is incorporated in a camera of the type wherein a photosensitive sheet is exposed and thereafter processed by being superposed with a second sheet and the sheets advanced between a pair of pressure- applying members for spreading a fluid processing composition in a layer between the sheets. One of the sheets includes, in addition to portions adapted to engage the stop member or members, means for collecting any excess processing composition and containers for carrying the processing compositon. These collecting means, disclosed in U.S. Patent No. 2,686,717 issued August 17, 1954 to Edwin H. Land, and the containers disclosed, for example, in U.S. Patent No. 2,543,181 issued February 27, 1951 in the name of Edwin H. Land, add thickness to the superposed sheets which causes an added resistance to movement of the sheets between the pressure-applying members. While the stop means described in the above-mentioned Patent No. 2,543,159 is essentially satisfactory, there may be a tendency on the part of the operator to attribute the added resistance to movement of the sheets to engagement of the stop members with the engageable portions of the sheet material and, accordingly, discontinue to advance the sheets. Then, after the operator has momentarily withdrawn the stop members from engagement with the sheet material and is again advancing the sheets, the stop members may unexpectedly engage the engageable portions which the operator had erroneously thought to be engaged previously. Because the engagement of the sheet by the stop members occurs unexpectedly, the operator may continue to advance the sheet causing it to be torn.

One solution to this problem was suggested in U.S. Patent No. 2,843,029 issued July 15, 1958 and comprises a sheet-arresting mechanism which includes means for positioning the stop members out of engagement with the sheets and responsive to movement of the sheets for returning the stop members to operative position in engagement with the sheet after a predetermined length of the sheets has been advanced past the stop members. This length of the sheet which must be advanced is calculated to insure that the engageable portions of the sheet thought to be erroneuosly engaged by the stop members have been advanced past the position of the stop members before the latter are allowed to move into operative position for engaging the next successive engageable portion or portions.

An object of the present invention is to provide, in photographic apparatus comprising a housing and means providing a path through said housing along which a sheet is adapted to advance, a mechanism for arresting the advancement of the sheet comprising stop means for engaging successive engageable portions on the sheet, means for positioning the stop means out of engagement with the enageable portion to permit the continued advancement of the sheet, and means responsive to movement of the sheet a predetermined distance relative to the stop means for retaining said control means out of operative position until said sheet has advanced said predetermined distance.

Another object of the invention is to provide a sheet arresting mechanism of the type described wherein said control means comprises means located in engagement with the sheet and adapted to be rotated thereby during movement of said sheet.

A further object of the invention is to provide a sheet-arresting mechanism of the above type that is inexpensive in construction and simple and dependable in operation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The sheet-arresting mechanism of the present invention is particularly adapted for use in photographic apparatus of the type herein illustrated and which generally includes means for processing successive exposed frames of a photosensitive sheet by superposing said frames on successive areas of a second sheet and by spreading a fluid processing composition in a thin layer between the superposed frames and areas of the sheets. The photosensitive sheet may include a layer of photosensitive material such as a silver halide emulsion in which a latent image is produced by differential exposure to actinic light and carried on a suitable support or backing. The second sheet is preferably adapted to serve as a support for an image-receptive layer in which a visible print of a latent image in the photosensitive layer may be produced. The processing composition is preferably capable, when spread in a thin layer between an exposed frame of the photosensitive sheet and an area of the second sheet, of effectuating a silver halide diffusion transfer reversal process by which a latent image in the photosensitive sheet is developed and a positive print is produced on the second sheet. Examples of photographic materials useful in processes of the foregoing type and of processes which the camera is adapted to perform are described in detail in the aforementioned U.S. Patent No. 2,543,181 and in U.S. Patent No. 2,662,822 issued to Edwin H. Land on December 15, 1953.

It is to be understood, of course, that the apparatus herein described is not limited to use with any particular species of photosensitive or second sheets, the terms "photosensitive" and "second" sheet being used in a broader sense to indicate a first sheet which is photosensitive and a second sheet which may merely aid in spreading the processing composition over a surface of the photosensitive sheet or may, if desired, possess other characteristics. It is also to be understood that while the sheet-arresting mechanism of the invention is particularly adapted for use in one type of photographic apparatus, it has equal utility in other forms of apparatus wherein sheet materials are advanced manually and are arrested by engagement of a portion of the apparatus with engageable portions of the sheet.

Generally, the camera in which the sheet-arresting mechanism is embodied includes an exposure chamber, in which portions of frames of a photosensitive sheet may be successively positioned for exposure to actinic light, and a processing chamber into which said portions are advanced during processing. At the entrance to the processing chamber there is provided a pair of pressure-applying members, for example rollers, adapted to receive therebetween a portion of the photosensitive sheet comprising an exposed frame from the exposure chamber and to superpose said portion of said photosensitive sheet with a second sheet. The second sheet has, on one of its surfaces, a succession of image-receiving areas arranged for registration with said frames and has affixed thereto a succession of containers of the fluid processing composition; one container being associated with each image-receiving area. As the sheets are advanced in superposed relation, between the pressure-applying rollers, processing composition is ejected from a container and spread in a thin layer between a frame of the photosensitive sheet and an image-receiving area of the second sheet, thereby forming a sandwich which is advanced into the processing chamber. The arresting mechanism is provided between the exposure chamber and the pressure-applying rollers for arresting advancement of the sheets when one frame and the image-receiving area, with which it is registered and superposed, have passed entirely between the rollers into the processing chamber and another frame of the photosensitive sheet is in position for exposure. The aforementioned superposed frame and area are allowed to remain within the processing chamber for a predetermined period during which a positive print is formed on the receiving area of the second sheet, and at the end of the predetermined processing period, the processing chamber may be opened and the developed positive print may be removed.

Figure 1:
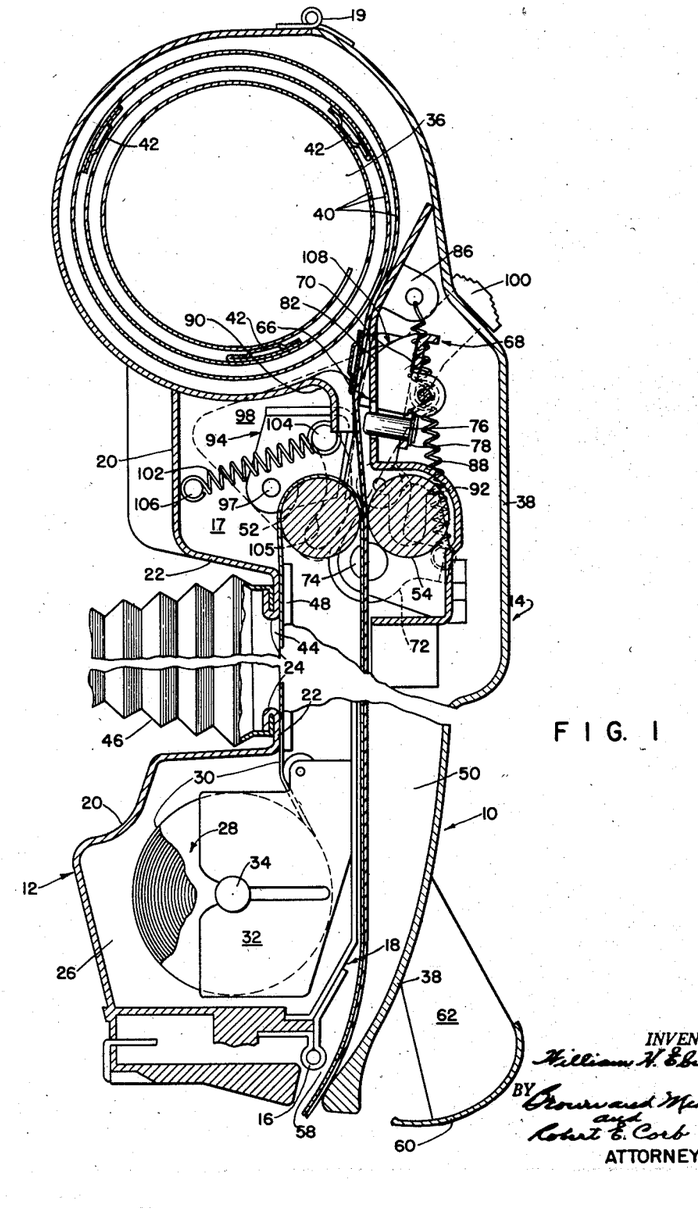
Figure 1 is a fragmentary, diagrammatic, sectional view of photographic apparatus in the form of a camera embodying the sheet-arresting mechanism of the invention.
Figures 2, 3:
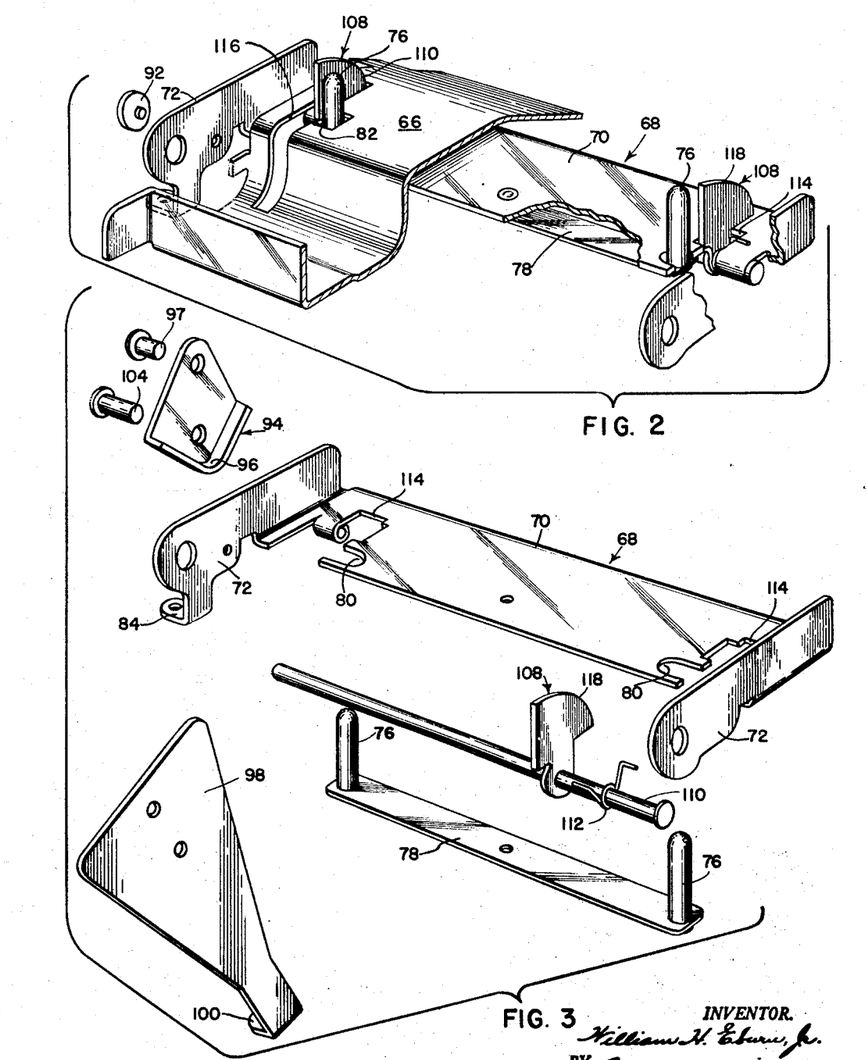
Fig. 2 is a fragmentary, perspective view of the sheet-arresting mechanism shown in Fig. 1.
Fig. 3 is an exploded perspective view of the mechanism of Fig. 2.

Reference is now made to the drawings and particularly to Figure 1 wherein there is shown, somewhat schematically, a hand-held camera of the folding type embodying the present invention.

The camera comprises a housing 10 including a forward section 12 and a rear section 14 for mounting and enclosing the various components of the camera mechanism. In order to provide access to the interior of the camera housing, forward and rear housing sections 12 and 14 are pivotally secured to one another at one end, described for purposes of illustration as the upper end, by a hinge 19, and the two housing sections include side walls which cooperate to provide a light-tight chamber when the two housing sections are in the closed or operative position shown. The housing comprises an intermediate section 18 pivotably mounted on hinge 16 at its lower end on forward housing section 12 between the forward and rear housing sections. Forward housing section 12 comprises a forward wall 20 and a central re-entrant section 22 provided with an exposure aperture 24 through which light is transmitted for exposing photosensitive materials positioned within the housing. Re-entrant section 22 further provides guide tracks on opposite sides of exposure aperture 24 for supporting an exposure frame of a photosensitive sheet in position for exposure across aperture 24.

The camera housing includes means for storing a supply of photosensitive sheet materials and this means, in the form shown, comprises a lower storage chamber 26 defined by forward wall 20 and intermediate housing section 18. Means are provided in lower chamber 26 for mounting a spool 28, around which is coiled an elongated photosensitive sheet 30, and comprise mounting members 32 adapted for pivotably engaging shafts 34 at the ends of spool 28. A second storage chamber 36 is provided in the upper portion of the camera housing between forward wall 20 and a rear wall designated 38 of rear housing section 14. Chamber 36 is adapted to contain a roll of a second or print-receiving sheet 40.

Photosensitive sheet 30 is preferably elongated and comprises a succession of areas or exposure frames adapted to be exposed through aperture 24. The second or print-receiving sheet 40 comprises a sequence of print-receiving areas, each adapted to be superposed with an exposed frame of the photosensitive sheet and to act as a support for a transfer print. A succession of containers designated 42 are provided mounted on print-receiving sheet 40 at substantially regularly spaced intervals with the containers being spaced so that one container is associated with one print-receiving area. Each container is provided with a discharge mouth facing the print-receiving area with which it is associated and located adjacent the leading edge of the print-receiving area so that the fluid contents of the container will be discharged toward the print-receiving area when compressive forces are applied to the container.

The camera includes an exposure chamber designated 44 defined by intermediate housing section 18, re-entrant section 22 and bellows 46 connected to a conventional lens and shutter assembly (not shown). Photosensitive sheet 30, when loaded into the camera, extends from lower chamber 26 upward through exposure chamber 44 across aperture 24 and is supported in position for exposure on the guide tracks provided by re-entrant section 22. Means such as a pressure plate 48 and spring (not shown) are provided on the forward side of intermediate housing section 18 for holding the photosensitive sheet against the guide tracks in position for exposure. The camera includes a processing chamber 50 at the rear of the exposure chamber and defined by intermediate housing section 18 and rear wall 38. Means are provided for superposing the photosensitive sheet with the second sheet and applying compressive pressure to the sheets and, in the form shown, comprise a pair of cylindrical rollers 52 and 54 mounted in juxtaposition at the upper ends of exposure chamber 44 and processing chamber 50 between said chambers and storage chamber 36. Photosensitive sheet 30 is guided upward from storage chamber 26 through exposure chamber 44 around roller 52 and downward between the latter and roller 54 into processing chamber 50. The second sheet 40 is guided downward from storage chamber 36 into superposition with the photosensitive sheet between rollers 52 and 54 into processing chamber 50. The rollers are adapted to superpose each exposed frame of the photosensitive sheet with a print-receiving area of the second sheet and spread the fluid contents of a container associated with the print-receiving area between the frame and area to form a sandwich as the sheets are advanced into the processing chamber.

In order to permit loading and threading of the sheet materials into the camera, roller 52 is pivotably mounted on the upper end of intermediate housing section 18 and is biased rearwardly toward roller 54 by a spring (not shown) mounted, for example, on forward wall 20. Roller 54 is pivotably mounted at its ends on rear wall 38 so that it is possible by virtue of this arrangement to insert a spool of photosensitive sheet material into lower chamber 26 and thread the sheet material across the exposure aperture and around roller 52 into superposition with second sheet 40 which is threaded, together with the photosensitive sheet between the two rollers into processing chamber 50. The lower and intermediate housing sections are so constructed as to provide, at the lower end of processing chamber 50 opposite rollers 52 and 54, an exit passage 58 through which portions of the sandwich positioned within the processing chamber may be drawn. An operator, by grasping the leading portions of the sandwich extending through exit passage 58, may draw the sandwich through the passage and thereby advance a predetermined portion of sheets 30 and 40 between rollers 52 and 54 into processing chamber 50, whereby a frame of photosensitive sheet 30, initially positioned for exposure across aperture 24, is advanced into registration with a print-receiving area of sheet 40. Continued advancement of sheets 30 and 40 between rollers 52 and 54 causes ejection of the processing composition from a container 42 associated with the frame and area and causes spreading of the processing fluid between the frame and area to form a sandwich which advances into the processing chamber. This sandwich is retained within the processing chamber for a predetermined period during which a positive print is preferably formed in the print-receiving area of the second sheet.

Means are provided for excluding light from processing chamber 50 during the processing of a frame and print-receiving area positioned therein. Accordingly, means are provided for preventing light from entering passage 58 and comprises a cutter bar 60 pivotably secured by legs 62 to rear housing section 14 and having an edge portion which, when bar 60 is in a closed position across passage 58, contacts portions of the shutter housing in the region of passage 58. The cutter bar also serves as a cutting blade against which an operator can draw portions of a sandwich projecting through passage 58 for severing said portions from portions within processing chamber 50.

A mechanism is provided in the camera housing between storage chamber 36 and processing chamber 50 for arresting the movement of a sandwich upon advancement of a predetermined length thereof between rollers 52 and 54 so as to position the next successive exposure frame for exposure within the exposure chamber. The sheet-arresting mechanism is intended to operate on the print-receiving sheet 40, and to adapt sheet 40 for this purpose, it is provided with pairs of regularly spaced perforations or openings 64, the openings of each pair being in opposite marginal portions of sheet 40, and one pair being associated with one print-receiving area of sheet 40.

The sheet-arresting mechanism comprises a guide plate 66 mounted within the camera housing on rear wall 38 between storage chamber 36 and processing chamber 50 for supporting and guiding second sheet 40 from the storage chamber between rollers 52 and 54 into the processing chamber. Guide plate 66 is approximately equal in width to the width of the second sheet and is shaped so as to provide a space between the guide plate and rear wall 38 in which elements of the arresting mechanism are housed.

One of these elements mounted between rear wall 38 and guide plate 66 is a support member generally designated 68 and comprising a transverse member 70 underlying plate 66 and two dependent arms 72 at the ends of the transverse member pivotably mounted on side walls 17 of rear housing section 14 by pivot pins 74. As a means for engaging openings or apertures 64 in second sheet 40, the arresting mechanism includes a pair of stop pins 76 mounted on the ends of a leaf spring 78 secured intermediate its ends at the rear side of transverse member 70. Transverse member 70 is provided with openings 80 and guide plate 66 is provided with underlying openings 82 through which stop pins 76 are adapted to project forwardly into engagement with the marginal portions of second sheet 40 as the latter is moved from chamber 36 across guide plate 66 between rollers 52 and 54. In order to urge the stop pins into engagement with the second sheet, transverse member 70 is biased forwardly against the rear or underside of guide plate 66, and this is accomplished by biasing support member 68 in a counterclockwise direction (viewing Figs. 1 and 3 through 6) about pivot pins 74. For this purpose, one of arms 72 is provided with an outwardly projecting ear 84 and guide plate 66 is provided with a rearwardly projecting ear 86. A coil spring 88 is connected between ears 84 and 86 for urging the ears toward one another and biasing the support member in the proper direction.

Movement of second sheet 40 is arrested by the mechanism of the invention as the sheet is moved across support plate 66 when an aperture or apertures 64 in the margins of the second sheet become aligned with stop pins 76 and the latter project into openings 64. The stop pins are fixed against movement in the direction of movement of the second sheet so that movement thereof is discontinued. Means are provided in the camera for urging the second sheet toward guide plate 66 and the stop pins, and, in the form shown, comprises a support or backing member 90 mounted on the forward housing section and extending toward the stop pins. Portions of the surface of member 90 located in alignment with the stop pins are recessed so that the stop pins can project into the openings in the second sheet while the second sheet is supported on or backed by member 90.

Following arrestment of the movement of the second sheet, in order to permit continued movement of the sheet, the stop pins must be withdrawn rearwardly from engagement with the apertures in the sheet. For this purpose, there is provided an outwardly projecting engagement member or pin 92 on one of arms 72. A release cam 94 having a generally V-shaped engagement portion 96 is mounted for pivotal movement about a pivot pin 97 on the side wall 17 of the camera housing adjacent the arm 72 on which pin 92 is mounted. Cam 94 is mounted for pivotal movement so that the apex of engagement portion 96 is movable through an arcuate path intercepted by pin 92. By virtue of this arrangement, as the cam is rotated the engagement portion thereof co-acts with pin 92, pivoting arm 72 rearwardly in a clockwise direction so that transverse member 70 and the stop pins 76 mounted thereon are displaced rearwardly and the pins disengaged from the apertures in the second sheet. As a means for manually pivoting release cam 94 to approximately 90°, there is provided a release lever 98 pivotally mounted on the exterior of side wall 17 on pivot pin 74, so as to extend rearwardly adjacent side wall 17, and including an engagement portion 100 projecting beyond the rear of the camera. Release lever 98 is coupled with cam 94 by a pin 104 engaged at one end in the release lever and engaged intermediate its ends in cam 94 at a position therein on a line between pin 97 and the apex of engagement portion 96. Pin 104 extends between the cam and release lever through an arcuate slot 105 in side wall 17, and the release lever is enlarged so as to cover slot 105 and prevent the admission of light into the camera through the slot. It is apparent from the drawings that movement of release cam 94 in either direction is effective to withdraw the stop pins from engagement with the second sheet and, accordingly, a spring 102 is provided for biasing release cam 94 in either direction and, specifically, in the direction in which it is being moved to release the stop pins, at the moment the stop pins are released. Spring 102 accordingly performs the function of preventing cam 94 from retaining the stop pins in released position, since its function is to rotate the cam from its position of release, that is, with the apex or V-shaped engagement portion 96 in engagement with engagement pin 92. Spring 102 is coupled at one end to pin 104 mounted on release cam 94 located on a line between pivot pin 97 and the apex of V-shaped engagement portion 96. The other end of spring 102 is engaged by a pin 106 mounted on the side wall of the housing on a line through engagement pin 92 and pivot pin 97 so that the spring exerts a rotational bias on the cam whenever the apex of the cam is located to either side of this last-mentioned line.

As previously noted, the release cam is adapted to displace stop pins 76 rearwardly from engagement with the second sheet only momentarily and, accordingly, means are provided for retaining the second sheet and the stop pins out of engagement with one another at least until the aperture in the sheet from which the stop pins have been withdrawn have been moved out of alignment with the stop pins. This last-mentioned means performs the added function of retaining the stop pins and second sheets out of engagement with one another until a sufficient length of the second sheet has been moved past the stop pins to ensure that apertures 64 in the second sheet have been moved past the stop pins even though movement of the second sheet was previously discontinued before the apertures in the second sheet had become aligned with the stop pins. This latter situation may occur, as previously noted, if the operator of the camera should mistake the increased resistance to movement of the sheets between the pressure-applying rollers due to a fluid trap as engagement of the pins with the apertures in the sheets. This means for holding the stop pins and the sheets out of engagement with one another comprises a pair of generally sector-shaped cams 108 mounted on a shaft 110 in turn mounted for pivotal movement on the rear of transverse member 70. Cams 108 are biased by torsion springs 112 in a clockwise direction so as to project forwardly through openings 114 in transverse member 70 and openings 116 in guide plate 66. Cams 108 are located closely adjacent and outside of stop pins 76 so as to engage the margins of second sheet 40, and shaft 110 is mounted on transverse member 70 adjacent and above the stop pins.

Figure 4:
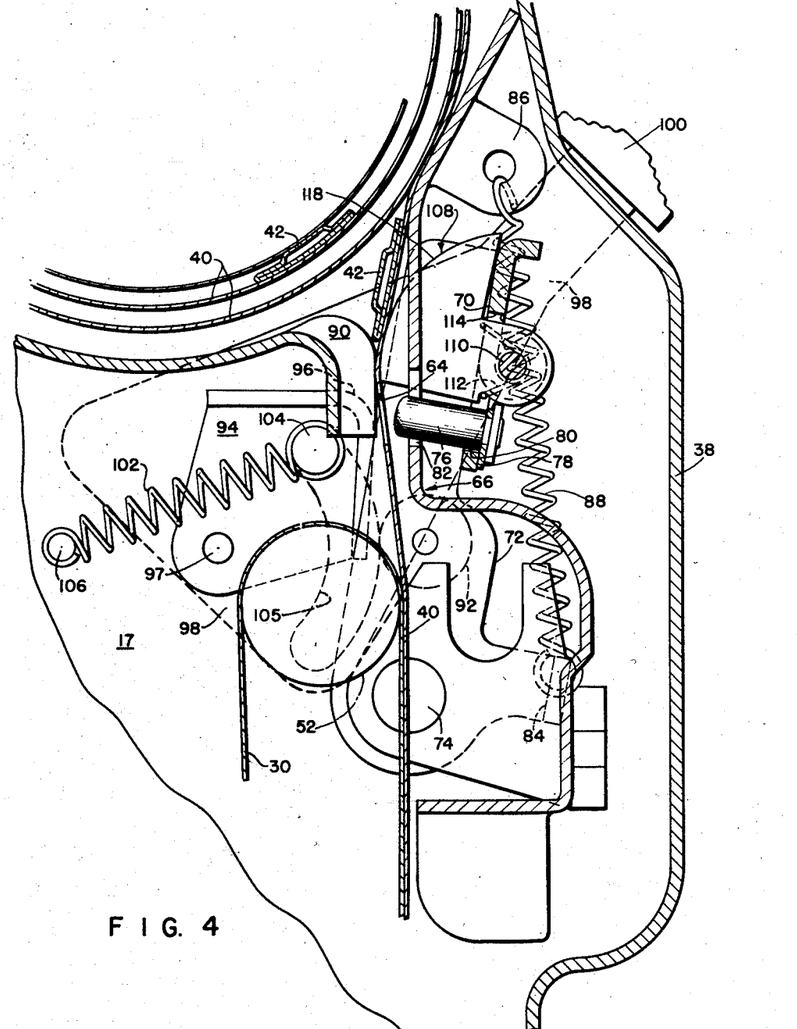
Figs. 4, 5 and 6 are fragmentary sectional views of the camera of Fig. 1 illustrating the operation of the mechanism of Fig. 2 and showing the mechanism in different operative positions.
Figure 5:
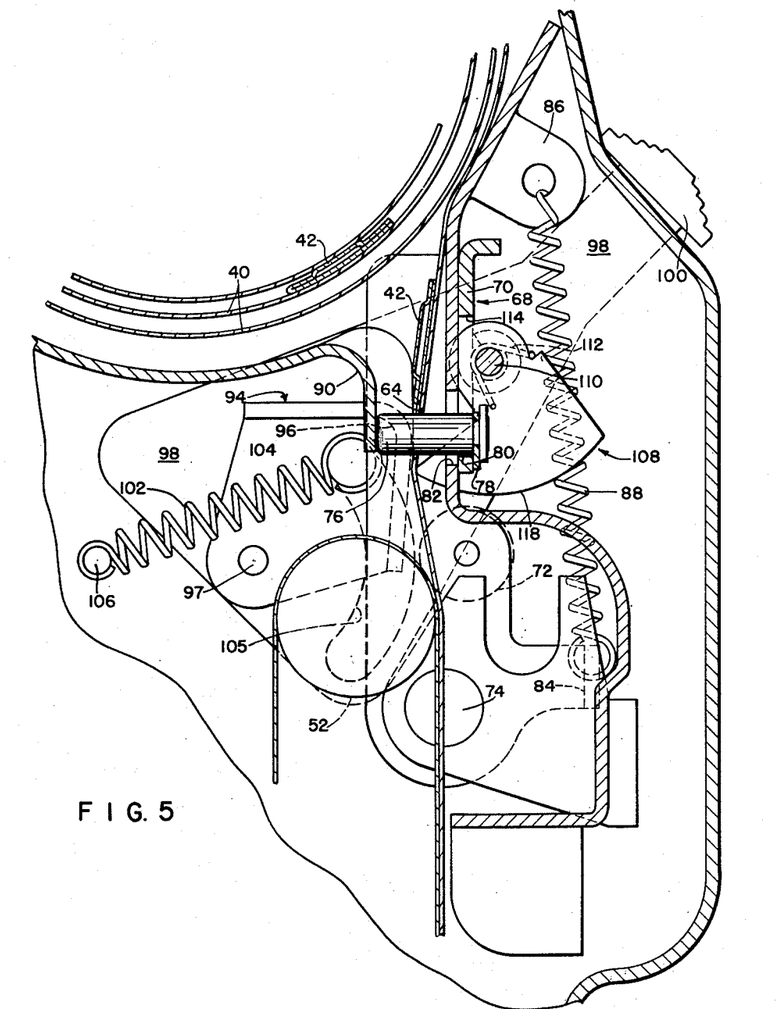

Each of cams 108 includes a generally circular sheet-engaging portion 118 having a center at the center of shaft 110 and a radius such that the sheet-engaging portion projects forwardly beyond the forward ends of stop pins 76 and, in the release position of the cams shown in Fig. 4, said cams extend toward the front of the camera through the openings in guide plate 66. In this release position of cams 108, the latter support the sheet out of engagement with the stop pins while displacing transverse member 70 and the stop pins rearwardly from their foremost position. As second sheet 40 is advanced from chamber 36 in engagement with cams 108, it causes the cams to pivot in a counterclockwise direction rearwardly behind guide plate 66 (as shown in Fig. 5) so that the stop pins may engage the second sheet and are in position to drop into apertures 64 in the second sheet as the apertures become aligned with the stop pins. The length of the second sheet which must be advanced past the stop pins, before the cam allows the stop pins to engage the sheet, is a function of the circumference of sheet-engaging portions 118 of cams 108 and can be of any predetermined length sufficient to ensure advancement of a predetermined length of the second sheet prior to engagement thereof by the stop pins.

Figure 6:
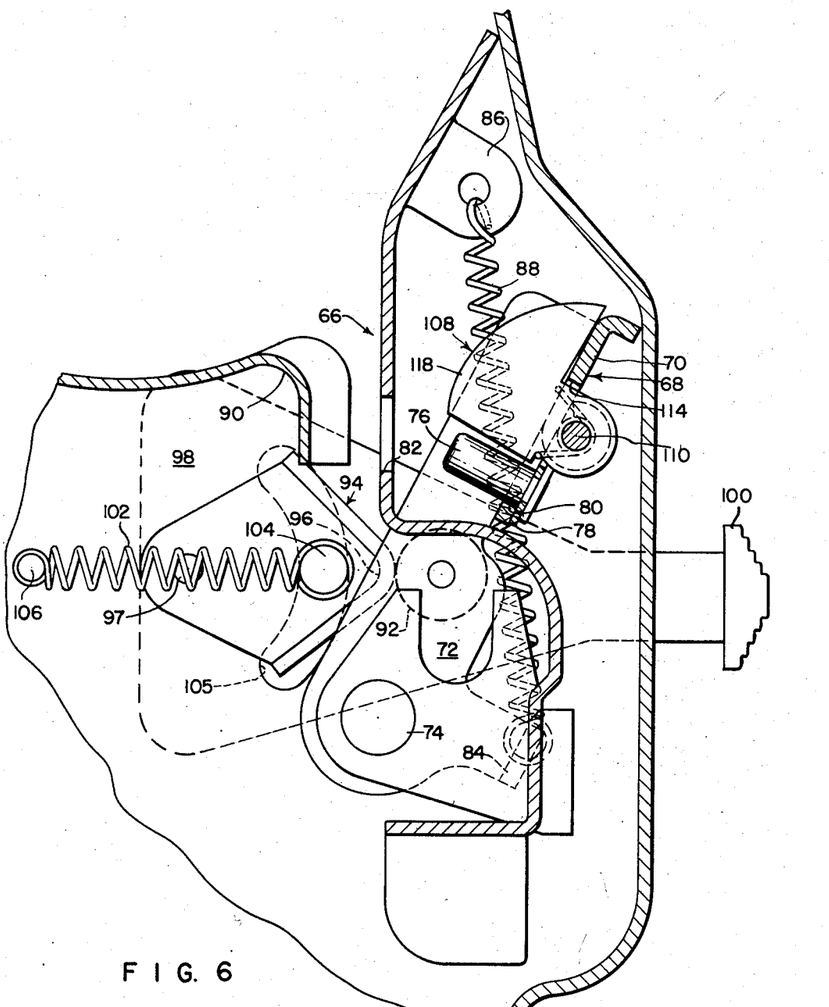

When it is again desired to release the stop pins and allow the continued movement of the second sheet, cam 94 is pivoted so as to co-act with engagement pin 92 for displacing transverse member 70 rearwardly to the position shown in Fig. 6. In this position, cams 108 are located entirely behind guide plate 66 and are free to pivot in a clockwise direction under the bias of torsion springs 112 until the cams are again in position to engage and support the second sheet away from pins 76 when transverse member 70 moves forwardly under the bias of spring 88. It should be noted that opening 114 in transverse member 70 is shorter than opening 116 in guide plate 66 so that the support member functions as a stop for the clockwise movement of cams 108 and positions the cams as shown in Fig. 4, while openings 116 permit the cams to extend forwardly through plate 66. Stop pins 76 are mounted on transverse member 70 so that they can be displaced rearwardly with respect to the transverse member and this is important inasmuch as the second sheet will cause the stop pins to be displaced rearwardly from their foremost position as the pins bear against the sheet during movement thereof. Even though the transverse member 70 is located in its forwardmost position due to the bias of spring 88, the stop pins must be displaced rearwardly during movement of the sheets so that they can move forwardly into the openings in the second sheet as the openings become aligned with the pins.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus through which photographic sheet material is moved, the combination in said apparatus of means for arresting movement of said sheet material, said means comprising at least one stop member for engaging successive engageable portions of said sheet material and arresting its movement past said stop member, said stop member being mounted for movement toward and away from said sheet material and being biased toward said sheet material; a control member mounted in a first position wherein a portion thereof extends beyond said stop member toward and into engagement with said sheet material for holding said stop member and said sheet material out of engagement with one another, said control member being mounted for movement from said first position in response to frictional engagement with said sheet material, during movement of the latter past said stop member, for allowing said stop member to engage said sheet material; and means for simultaneously disengaging said stop member from said sheet material and returning said control member to said first position.

2. The photographic apparatus of claim 1 wherein said control member is mounted for pivotal movement from said first position in response to frictional engagement of a portion of said control member with said sheet material during movement of the latter past said stop member and said control member.

3. The photographic apparatus of claim 2 wherein said control member comprises a cam having a circular peripheral portion with a center at the pivotal axis of said cam for projecting beyond said stop member into frictional engagement with said sheet material.

4. The photographic apparatus of claim 3 wherein said circular peripheral portion of said cam has a circumference equal to the length of said sheet material which must be moved past said stop member before said stop member is allowed by said control member to engage said sheet material.

5. The photographic apparatus of claim 1 wherein said stop member and said control member are mounted together for movement toward and away from said sheet material and are biased toward said sheet material, and the last-mentioned means for withdrawing said stop member from engagement with said sheet material is operative for simultaneously withdrawing said control member from engagement with said sheet material.

6. The photographic apparatus of claim 5 wherein said stop member is mounted for pivotal movement with respect to said stop member from said first position in response to frictional engagement with said sheet material during movement of said sheet material past said stop member and said control member, and resilient means are provided for pivoting said control member into said first position during displacement of said stop member and said control member from engagement with said sheet material.

7. In photographic apparatus through which photographic sheet material is moved, in combination, means for arresting movement of said sheet material, said means comprising at least one stop member for engaging successive engageable portions of said sheet material and arresting its movement past said stop member, said stop member being mounted for movement toward and away from said sheet material and biased toward said sheet material, a control member coupled with said stop member for holding said stop member and said sheet material out of contact with one another, said control member being mounted for movement, in response to movement of said sheet material relative to said stop member in frictional engagement with said control member, from a first position in engagement with said sheet material wherein said control member is operative for holding said stop member and said sheet material out of contact with one another to a second position wherein said control member is inoperative for holding said stop member and said sheet material out of contact with one another, and means for withdrawing said stop member from engagement with said sheet material and returning said control member to said first position.

8. The photographic apparatus of claim 7 wherein said control member is mounted for pivotal movement from said first to said second position.

9. The photographic apparatus of claim 7 wherein said stop member and said control member are mounted together for movement toward and away from said sheet material and are biased toward said sheet material, and the last-mentioned means for withdrawing said stop member from engagement with said sheet material is operative for simultaneously withdrawing said control member and said stop member from engagement with said sheet material.

10. The photographic apparatus of claim 9 wherein said control member is mounted for pivotal movement with respect to said stop member from said first to said second position, and resilient means are provided for returning said control member to said first position when said control member and said stop member are moved from engagement with said sheet material.

11. In photographic apparatus through which photographic sheet material is moved, in combination, means for arresting the movement of said sheet material, said means comprising at least one stop member for engaging successive engageable portions of said sheet material and arresting its movement past said stop member, control means including a control member, means for mounting said stop member and said control member for movement toward and away from said sheet material and urging said stop member and control member into engagement with said sheet material, said control member having a first position wherein a portion thereof extends toward said sheet material in the same direction as said stop member beyond the extremity of said stop member for holding said sheet material and said stop member out of contact with one another, said control member being movable, in response to frictional engagement with said sheet material during movement thereof, relative to said stop member from said first position to free said stop member for movement into contact with said sheet material, and means for displacing said stop member and said control member from said sheet material and returning said control member to said first position.

12. The photographic apparatus of claim 11 wherein said control member is mounted for pivotal movement with respect to said stop member and is pivotable from said first position in response to movement of said sheet material in frictional engagement with said control member.

13. The photographic apparatus of claim 11 wherein said means for arresting movement of said sheet material comprises two stop members, and said control means comprises two pivotal members each positioned adjacent one of said stop members for engaging the marginal portions of said sheet material.

14. The photographic apparatus of claim 11 wherein said control member comprises a cam mounted for rotation on said means for mounting said control member and said stop member about an axis spaced from said stop member in the direction of movement of said sheet material, said cam having an arcuate sheet-engagement portion with a center at the center of rotation of said cam.

15. The photographic apparatus of claim 14 wherein said sheet-engagement portion of said cam is sector-shaped and the circumference thereof is substantially equal to the length of sheet material which must be advanced for rendering said stop member operative for arresting the movement of said sheet material.

16. In photographic apparatus through which photosensitive sheet material is moved, in combination, means for arresting the movement of said sheet material, said means comprising a pair of stop members for engaging successive pairs of apertures in the margins of said sheet material and arresting the movement of said sheet material past said members, support means including a support member extending transversely of the direction of movement of said sheet material, said stop members being mounted on said support member and extending toward said sheet material, resilient means for so biasing said support means as to urge said stop members into engagement with said sheet material, control means including a pair of pivotal members mounted on said support member adjacent said stop members for rotation relative to said support member, each of said pivotal members having a sheet engagement portion and a first position wherein said sheet engagement portion extends toward said sheet material in the same direction as said stop members beyond the extremities of said stop members for holding the latter and said sheet material out of engagement with one another, resilient means for biasing said pivotal members into said first position, said pivotal members being rotatable in response to movement of a predetermined length of said sheet material past said stop member in engagement with said portions of said pivotal members, from said first position away from said sheet material for freeing said stop members for movement into engagement with said sheet material, and means for displacing said support member, and said stop members and said pivotal members mounted thereon, away from said sheet material and out of contact therewith and thereby allowing said pivotal members to return to said first position under the bias of the last-mentioned resilient means while said pivotal members are so displaced.

17. The photographic apparatus of claim 16 wherein said stop members are mounted on said support member for movement independently of one another with respect to said support member toward and away from said sheet material and are resiliently biased toward said sheet material.

18. The photographic apparatus of claim 16 wherein each of said stop members is mounted on a resilient member secured to the side of said support member opposite said sheet material and said support member is provided with openings through which said stop members project toward said sheet material, said openings providing means for restraining said stop members against movement in the direction of movement of said sheet material.

19. The photographic apparatus of claim 16 wherein each of said pivotal members comprises a cam mounted for rotation on said support member about an axis spaced from said stop members in the direction of movement of said sheet material and said sheet-engagement portion comprises an arcuate portion of said cam having a center at the center of rotation of said cam.

20. In photographic apparatus through which photographic sheet material is moved, in combination, means for arresting movement of said sheet material comprising at least one stop member for engaging successive engageable portions of said sheet material and arresting its movement past said stop member, said stop member being mounted for movement toward and away from said sheet material and biased toward said sheet material, a control member coupled with said stop member for holding said stop member and said sheet material out of contact with one another, said control member being mounted for movement, by movement of said sheet material relative to said stop member in frictional engagement with said control member, from a first position in engagement with said sheet material wherein said control member is operative for holding said stop member and sheet material out of contact with one another to a second position wherein said control member is inoperative for holding said stop member and said sheet material out of contact with one another, and means for withdrawing said stop member from engagement with said sheet material and returning said control member to said first position, the last-mentioned means comprising resilient means for returning said control member to said first position and manually operable means for momentarily displacing said stop member and said control member away from said sheet material and out of contact therewith whereby said control member is free to move to said first position while it is so displaced.

21. In photographic apparatus through which photographic sheet material is moved, in combination, means for arresting the movement of said sheet material comprising a guide plate for supporting said sheet material during a portion of the movement thereof, at least one stop member for engaging successive portions of said sheet material in the region of said guide plate and arresting the movement of said sheet material past said guide plate and said stop member, support means including a support member located to the side of said guide plate opposite said sheet material and mounted for movement toward and away from said sheet material, said stop member being mounted on said support member and extending toward said sheet material through openings in said guide plate, resilient means for biasing said support means so as to urge said stop member into contact with said sheet material, a control member mounted on said support member for movement relative to said support member and having a first position wherein a portion of said control member extends toward said sheet material through an opening in said guide plate beyond the extremity of said stop member for holding said stop member and said sheet material out of contact with one another, resilient means for returning said control member to said first position, and manually operable means for momentarily displacing said stop member and said control member away from said sheet material and out of contact therewith whereby said control member is free to move to said first position while it is so displaced.

22. In photographic apparatus through which photographic sheet material is moved, in combination, means for arresting movement of said sheet material comprising at least one stop member for engaging successive engageable portions of said sheet material and arresting its movement past said stop member, said stop member being mounted for movement toward and away from said sheet material and biased toward said sheet material, a control member coupled with said stop member for holding said stop member and said sheet material out of contact with one another, said control member being mounted for movement in response to movement of said sheet material relative to said stop member in frictional engagement with said control member, from a first position in engagement with said sheet material wherein said control member is operative for holding said stop member and sheet material out of contact with one another, to a second position wherein said control member is inoperative for holding said stop member and said sheet material out of contact with one another, a backing member mounted on the side of said sheet material opposite said stop member and control member for supporting said sheet material against said stop member and control member, and means for displacing said stop member and said control member away from said sheet material out of contact therewith and for returning said control member to said first position while it is so displaced.

References Cited in the file of this patent
UNITED STATES PATENTS 1,535,930     MacDonald             Apr. 28, 1925